(12) United States Patent
Burke et al.

(10) Patent No.: US 7,249,971 B2
(45) Date of Patent: Jul. 31, 2007

(54) HERMETIC ELECTRICAL CONNECTOR

(75) Inventors: Charles P. Burke, Humble, TX (US);
Ronald E. Taylor, Spring, TX (US);
Steven D. Fraley, Houston, TX (US);
James N. Spence, Montgomery, TX (US); Martin L. Tomek, Humble, TX (US); Trung Dinh Nguyen, Houston, TX (US)

(73) Assignee: Greene, Tweed of Delaware, Inc., Wilmington, DE (US)

(*) Notice: Subject to any disclaimer, the term of this patent is extended or adjusted under 35 U.S.C. 154(b) by 0 days.

(21) Appl. No.: 11/068,140

(22) Filed: Feb. 28, 2005

(65) Prior Publication Data
US 2005/0202720 A1  Sep. 15, 2005

Related U.S. Application Data

(60) Provisional application No. 60/548,618, filed on Feb. 27, 2004.

(51) Int. Cl.
*H01R 13/40* (2006.01)
(52) U.S. Cl. .................................... 439/589; 439/736
(58) Field of Classification Search ............... 439/587, 439/589, 271, 274, 275, 736, 936
See application file for complete search history.

(56) References Cited

U.S. PATENT DOCUMENTS

| | | | | |
|---|---|---|---|---|
| 3,998,515 A | * | 12/1976 | Panek | ......................... 439/198 |
| 4,053,201 A | | 10/1977 | Grappe | |
| 4,356,344 A | | 10/1982 | Carey | |
| 4,445,744 A | * | 5/1984 | Sedig et al. | .................. 439/271 |
| 4,519,662 A | | 5/1985 | Riley et al. | |
| 4,753,604 A | * | 6/1988 | Wheeler | ..................... 439/271 |
| 4,797,122 A | | 1/1989 | Kuboi et al. | |
| 4,984,973 A | | 1/1991 | Itameri-Kinter et al. | |
| 5,015,192 A | * | 5/1991 | Welsh et al. | ................... 439/83 |
| 5,099,572 A | * | 3/1992 | Lazaro et al. | .................. 29/863 |
| 5,203,723 A | * | 4/1993 | Ritter | ......................... 439/589 |
| 5,278,357 A | | 1/1994 | Yamanashi | |

(Continued)

OTHER PUBLICATIONS

Kemlon Products and Development drawings for Glass Sealed With Polyether; Glass Bonded Ceramic; KEMTHREAD™; Ceramic; http://www.kemlon.com/catologs/duoseel/techinfo1/tech; p. 3 of 5; (Mar. 7, 2005 10:25 AM printout).

(Continued)

*Primary Examiner*—Hein Vu
(74) *Attorney, Agent, or Firm*—Flaster/Greenberg P.C.

(57) ABSTRACT

A hermetic pressure connector which provides a pressure-tight, electrically conductive connection through a hole in a bulkhead. The connector includes a transverse support member having a high pressure side and an opposite low pressure side. A passage extends through the transverse support member between the opposite sides. A conductor pin having an axial portion extends through the passage. An insulating sleeve surrounds at least the axial portion of the conductor pin, thereby electrically insulating the transverse support member from the conductor pin. A molded connected body surrounds at least a central portion of the conductor pin at least at one of the high and low pressure sides to thereby mechanically support the conductor pin in the passage. The molded connector body is directly sealingly engaged with the conductor pin, the insulating sleeve and the transverse support member.

12 Claims, 7 Drawing Sheets

U.S. PATENT DOCUMENTS

| | | |
|---|---|---|
| 5,299,949 A | 4/1994 | Fortin |
| 5,387,119 A | 2/1995 | Wood |
| 5,485,673 A | 1/1996 | Lau |
| 5,518,415 A | 5/1996 | Sano |
| 5,535,512 A * | 7/1996 | Armogan .................. 29/877 |
| 5,630,732 A | 5/1997 | Yamanashi |
| 5,733,145 A | 3/1998 | Wood |
| 5,797,761 A | 8/1998 | Ring |
| 5,823,811 A | 10/1998 | Blanchfield et al. |
| 6,582,251 B1 * | 6/2003 | Burke et al. ............... 439/589 |

OTHER PUBLICATIONS

Kemlon Products and Development drawings; K-25 BMA; K-25PT; http://www.kemlon.com/catologs/duoseel/k25/k25.htm; p. 2 of 6; (Mar. 7, 2005 printout).

Kemlon Products and Development drawings; K-16 BMA; K-16 BMAS2; K-16BMAS; http://www.kemlon.com/catologs/duoseel/k16/k16.htm; p. 3 of 4; (Mar. 7, 2005 printout).

* cited by examiner

HERMETIC ELECTRICAL CONNECTOR

CROSS-REFERENCE TO RELATED APPLICATIONS

This application claims priority from U.S. Provisional Patent Application No. 60/548,618 filed Feb. 27, 2004 and entitled "Hermetic Electrical Connector and Method of Making Same," the entire subject matter of which is hereby incorporated herein by reference.

BACKGROUND OF THE INVENTION

This invention relates to electrical connectors and, more particularly, to hermetically sealed electrical connectors for use in passing electrical conductors through a bulkhead while simultaneously isolating high pressure on one side of the bulkhead from low pressure on the other side of the bulkhead.

Various structures have been developed as electrical connectors to allow ready attachment and detachment of wires between electrical devices. Many electrical connectors include a plug and a receptacle. The plug includes one or more electrically conductive male contacts or pins, and the receptacle includes a like number of female electrically conductive contacts. Either the male contacts, the female contacts, or both are permanently electrically connected to wires or leads. Either the plug or the receptacle is mounted in a wall or secure structure, such as a bulkhead, although in some instances both the plug and the receptacle will be connected to one another independently of any other structure. Electrical connection is easily achieved by pushing the male contacts on the plug into the receptacle (or vice versa), and disconnection is achieved by pulling the plug out of the receptacle. Such components are often mated with other components such as socket blocks or sealed connector boot assemblies. Where the connector is situated within a bulkhead, the connector is essentially the main component and attachment to each of the exposed ends of the conductors of the connector could be accomplished either by direct and permanent connection to egress leads or by removable connections as described above.

Generally the electrically conductive contacts of both the plug and the receptacle are supported in a dimensionally stable, electrically insulative material surrounded by a metallic housing or similar rigid structure. This insulator electrically isolates the various contacts and further maintains alignment of the contacts for ready connection and disconnection and to maintain electrical isolation from the housing and the bulkhead, if any. Metal housings are often used to provide greater support for the connector, and are particularly useful in settings where high forces will be encountered by the connector. Notwithstanding the advantages of using housings, such structures can have significant drawbacks, including the cost of making the housings and incorporating the housings into the connector.

Moreover, in certain settings it is desired that either the plug or receptacle be "hermetically" sealed, i.e., sealed so as to prevent egress of fluids across a boundary created by the seal. Hermetically sealed connectors are particularly useful when it is necessary to maintain a controlled environment on one or both sides of the connector, and specifically where the integrity of electrical power or an electrical signal must be maintained between a region of relatively high pressure from a region of relatively low pressure. Hermetic connectors have particularly great utility in the field of downhole well tools used for subterranean drilling operations, where temperatures can exceed 500 degrees Fahrenheit and pressures can reach above 30,000 pounds per square inch. In such settings, various electronic components are housed within the downhole well tools and such electronics generally are designed to operate at atmospheric pressure, thereby requiring effective isolation between the high pressures of the ambient environment within the well and the low or atmospheric pressure within electronics modules. Additionally, it is generally required that electrical leads pass from within the sealed well, at high pressure, to the ambient conditions above ground to provide for control and monitoring within the well. Accordingly, for both conditions, hermetic connectors are essential to the functioning of downhole well tools.

Hermetic connectors for high temperature and high pressure service are known in the prior art, for example the invention described by U.S. Pat. No. 6,582,251 (Burke et al., "the '251 patent"). The invention of the '251 patent eliminates use of a housing in the construction of an electrical connector thereby eliminating a potential leak path between the insulator and the housing. Similar to the present invention, the invention of the '251 patent comprises electrical conductors embedded in polymeric materials. One limitation of the invention of the '251 patent is that at extreme pressures and temperatures (e.g. 30,000 psi and 500 deg F.), the connector polymeric materials are subject to creep and movement of the conductor pins can subsequently occur, resulting in unacceptable levels of reliability of the '251 patent connector at these extreme conditions.

The connector of the present invention provides improved reliability at extreme pressure and temperature conditions, while preventing pressure or electrical leakage. It can be used in a high temperature environment wherein high pressure differential exists and there is a need to protect electronics or other electrical or mechanical assemblies from exposure to undesirable higher or lower pressures than those at which they were designed to operate, and where electrical power or signals must be passed across the boundary between high and low pressure.

SUMMARY OF THE INVENTION

Briefly stated, the present invention is directed to a hermetic pressure connector for providing a pressure-tight, electrically conductive connection through a hole in a bulkhead. The connector includes a transverse support member having a high pressure side and an opposite low pressure side. A passage extends through the transverse support member between the opposite sides. A conductor pin having an axial portion extends through the passage. An insulating sleeve surrounds at least the axial portion of the conductor pin, thereby electrically insulating the transverse support member from the conductor pin. A molded connector body surrounds at least a central portion of the conductor pin at least at one of the high and low pressure sides to thereby mechanically support the conductor pin in the passage. The molded connector body is directly sealingly engaged with the conductor pin, the insulating sleeve and the transverse support member.

Briefly stated, in another aspect, the present invention is directed to a hermetic pressure connector for providing a pressure-tight, electrically conductive connection through a hole in a bulkhead. The connector includes a transverse support member with a passage extending through the transverse support member. A conductor pin having an axial portion extends through the passage. A molded connector body surrounds at least a central portion of the conductor pin to thereby mechanically support the conductor pin in the passage. The molded connector body is directly sealingly engaged with the conductor pin and the transverse support member. A dovetail retention feature interlocks the transverse support member to the molded connector body.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
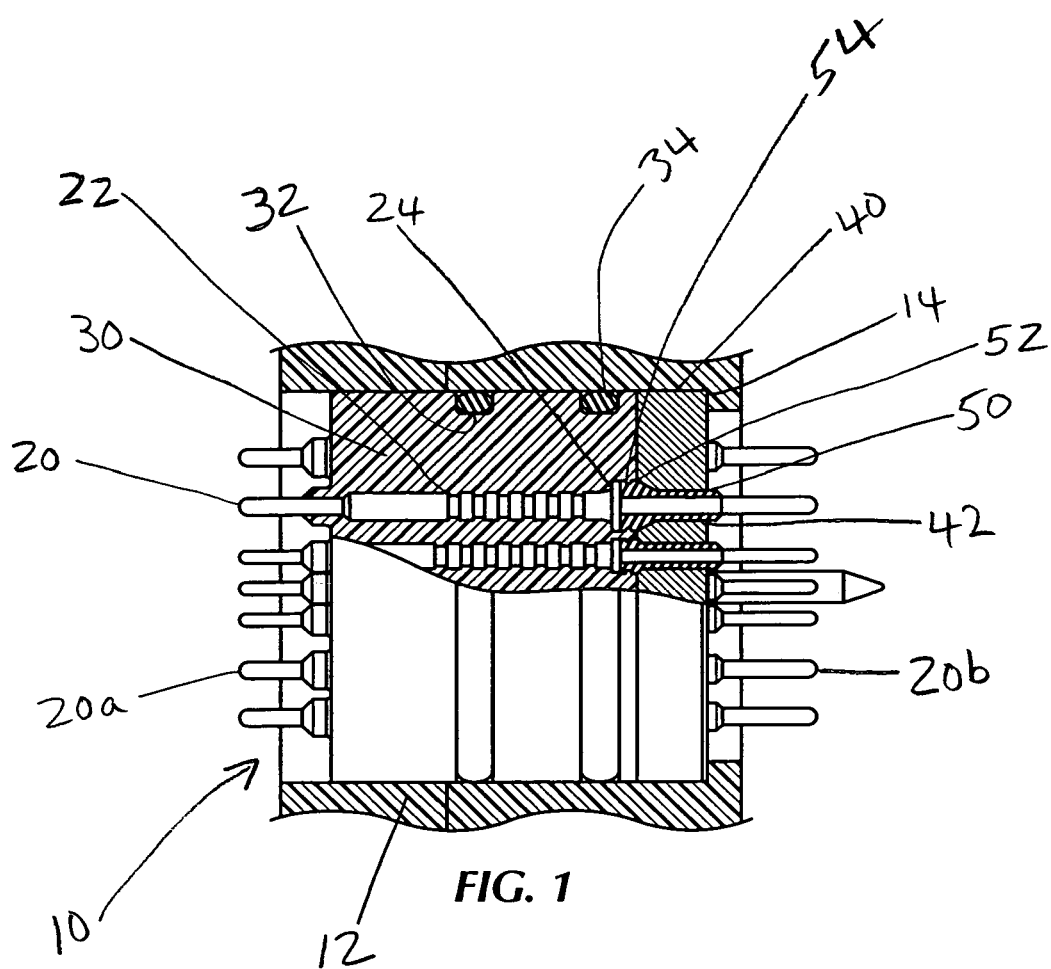
FIG. 1 is a side view, shown partially in cross section, of a hermetic pressure connector installed within a bulkhead, in accordance with a first preferred embodiment of the present invention.

Certain terminology is used in the following description for convenience only and is not limiting. The words "right", "left", "upper" and "lower" designate directions in the drawings to which reference is made. The terminology includes the words above specifically mentioned, derivatives thereof, and words of similar import.

Referring to the drawings, wherein like reference numerals are used to designate the same components throughout the figures, shown in FIGS. 1-12 are first through twelfth presently preferred embodiments of a hermetic pressure connector having enhanced reliability and performance at elevated temperature and pressure conditions. With particular reference to FIG. 1, a first embodiment electrical connector 10 is shown installed in a bulkhead 12, such as would be commonly found in a wellbore tool apparatus of the type well-known to those of ordinary skill in the subterranean drilling art. It will be recognized by those of ordinary skill in the art that the present invention need not be limited in application to the wellbore tool apparatus, but may have application in any situation wherein a difference in environmental conditions exists across a boundary, and it is desired to pass electrical current across the boundary.

The electrical connector 10 includes a plurality of conductor pins 20, set within a molded connector body 30. The electrical connector 10 further includes a transverse support member 40 having a plurality of passages 42 through which the plurality of pins 20 separately pass. Each conductor pin 20 is surrounded by an insulating sleeve 50 which separates each conductor pin 20 from the support member 40. An outer circumference of the support member 40 seats against a pressure bearing ledge 14 to transfer load from the connector body 30 and conductor pins 20 to the bulkhead 12 when the connector 10 is installed in the bulkhead 12.

The conductor pins 20 each have a high pressure end 20*a* and a low pressure end 20*b*. Each conductor pin 20 is provided with at least one and preferably a plurality of circumferential grooves 22 and a shoulder 24. The shoulder 24 bears against a base portion 52 of the insulating sleeve 50 to transfer the differential pressure load imposed on the conductor pin 20 from the high pressure end 20*a* to the low pressure end 20*b*. The differential pressure load is reacted from the shoulder 24 to the insulating sleeve 50 to the support member 40 to the bulkhead 12. The transverse support member 40 may be permanently joined to the bulkhead 12 by using a low temperature welding technique like laser or electron beam welding or by machined features like a dovetail which ingress of plastic during molding will subsequently retain.

The conductor pins 20 are preferably constructed from beryllium copper alloy, UNS C17300, available from Brush Wellman Inc., located in Cleveland, Ohio, but numerous other conductive metallic materials can also be used, including 17-4 PH stainless steel, Inconel X750, Inconel 625, brass and other copper alloys, stainless steel, etc.

The transverse support member 40 is preferably made from a metallic material, and more preferably from martensitic, precipitation hardened stainless steel alloy UNS S17400, commonly referred to as 17-4 SS, available from Earl M. Jorgensen Inc., located in Houston, Tex. The 17-4

SS material is preferably designated at the H900 condition to minimize the thickness of the transverse support member 12 and to provide the desired resistance to bending and elongation. PH 13-8 MO condition H950 material can be used where even greater material strength is required. Where very low magnetic permeability is desired, the preferred material is Inconel 718, UNS N07718, available from various sources, including Earl M. Jorgensen, Inc. It is also contemplated, however, that the support member 40 could be made from any rigid material that provides adequate support for the conductor pins 20 when subjected to extremely high pressure differentials. Further, the use of an insulative structural material such as XYCOMP™ composite material available from Greene Tweed & Co., Inc. ("GT"), located in Kulpsville, Pa. could be used to fabricate the support member 40, to enhance electrical performance. Also, ceramic materials such as transformation toughened zirconia ("TTZ"), alumina and other ceramics could be used for fabrication of the support member 40.

Those of ordinary skill in the art will recognize the thickness of the transverse support member 40 can be varied to suit the specific strength required in a given application, depending on the pressure differential across the connector 10 and the material from which the transverse support member 40 is constructed. It is preferred that the transverse support member 40 extend radially to contact the bulkhead 12, such that the transverse support member 40 provides support to the connector 10 across its entire diameter, thereby improving the resistance of the connector 10 to high pressure differentials across the bulkhead 12. The conductor pins 20 pass through the passages 42 in transverse support member 40 thereby providing a conductive path through the connector 10 for passage of electrical current. The number of conductor pins 20 may vary from one to several, depending on the needs of the particular application. However, as those of ordinary skill in the art will recognize, there is no real upper limit on the number of conductor pins 20 that could be accommodated. Of significance in determining the number of conductor pins 20 that can be accommodated in the connector 10 is the gauge or diameter of each conductor pin 20.

The insulating sleeves 50 each include a base portion 52 having at least one circumferential groove 54 therein. The groove 54 assists in retaining the insulating sleeve 50, the conductor pin 20 and the transverse support member 40 to the connector body 30. Alternatively, the insulating sleeve 50 could be fixedly attached to the support member 40, eliminating the need for the groove 54 (see, for example, the fifth embodiment 410 electrical connector discussed below herein). The base portion 52 engages the conductor pin shoulder 24, and transfers load from the conductor pin 20 to the support member 40, thus helping to provide stability to the conductor pins 20 at elevated temperature and pressure conditions, at which the material of the conductor body 30 may be subject to creep.

The insulating sleeves 50 may be fabricated from a variety of materials, including many polymeric materials like PEEK (polyetheretherketone), PEEK-HT (higher glass transition temperature PEEK), PEKK (polyetherketoneketone), PAEK (polyaryletherketone), PPS (polyphenylene sulfide), PBI (polybenzimidazole), LCP (liquid crystal polymer), structural glasses, polycrystalline diamond, VESPEL™ or AURUM™ polyimides, PAI (polyamidimide), PEI (polyetherimide), XYCOMP™ composites (or similar PEEK and glass fiber composites) or any number of other alternatives. Unfilled and filled grades of these and other polymers are also applicable. Fillers would include but are not limited to glass fibers, glass beads, aramyd fibers, ceramics, and other insulative compounds. Thermoset materials are also possible in either unfilled or filled grades. Composites of all the polymers listed above combined with glass beads or glass fibers could be used to fabricate the insulating sleeves 50. The glass fibers could be of varying length, up to and including being continuous. Further, ceramic materials such as TTZ, Alumina, Silicone Dioxide, machineable ceramics like those offered from Macor, synthetic sapphire, and other electrically insulative structural ceramics are envisioned. Additionally, ceramic or polymeric coated metallic materials (where the coating provides electrical isolation and the metal substrate provides structural rigidity and creep resistance) could be used. It is expected that for the ultimate pressure and temperature capabilities that ceramic materials will be used in the preferred embodiments.

The molded connector body 30 surrounds at least a central portion of the conductor pins 20 and electrically insulates the conductor pins 20 from the bulkhead. To permit enhanced sealing between the connector 10, and in particular the connector body 30, and the bulkhead 12, the connector body 30 preferably includes at least one circumferential groove 32 in an external surface thereof. A seal ring 34, preferably an O-ring, either alone or combined with a backup ring, is situated in the circumferential groove 32 so as to form a seal between the connector body 30 and the bulkhead 12. The seal ring 34 is preferably constructed from Compounds #926 or #780, available from GT. In the highest temperature applications, GT's #605 CHEMRAZ® elastomer material is preferred. It is contemplated that more than one circumferential groove 32 and seal ring 34 may be employed without departing from the scope and spirit of the invention. Additionally, it is contemplated that the connector 10 could be employed without any circumferential grooves 32 and seals 34, the connector body 30 providing a seal against the bulkhead 12, or that alternative devices for sealing (not shown) could be used, including GT rings, Advancap seals, ENERCAP® seals, metal spring energized non-elastomer seals (MSE™), Polypak seals, elastomeric and non-elastomeric cup seals etc.

The connector body 30 preferably is constructed from a polymeric material, preferably insulative thermoplastic, and most preferably from polyetherketone (PEK), produced by Victrex Ltd. and sold by Greene, Tweed & Co. under the trademark ARLON 2000®. This material is most preferable because of its ability to maintain dimensional stability and consistent mechanical properties at high temperatures (in excess of 400° F.). It is contemplated that other polymeric materials, such as ULTEM, PAEK, PEEK, or PEKK, PPS, PBI, LCP, or PAI may be employed without departing from the scope and spirit of the invention.

Figure 2:
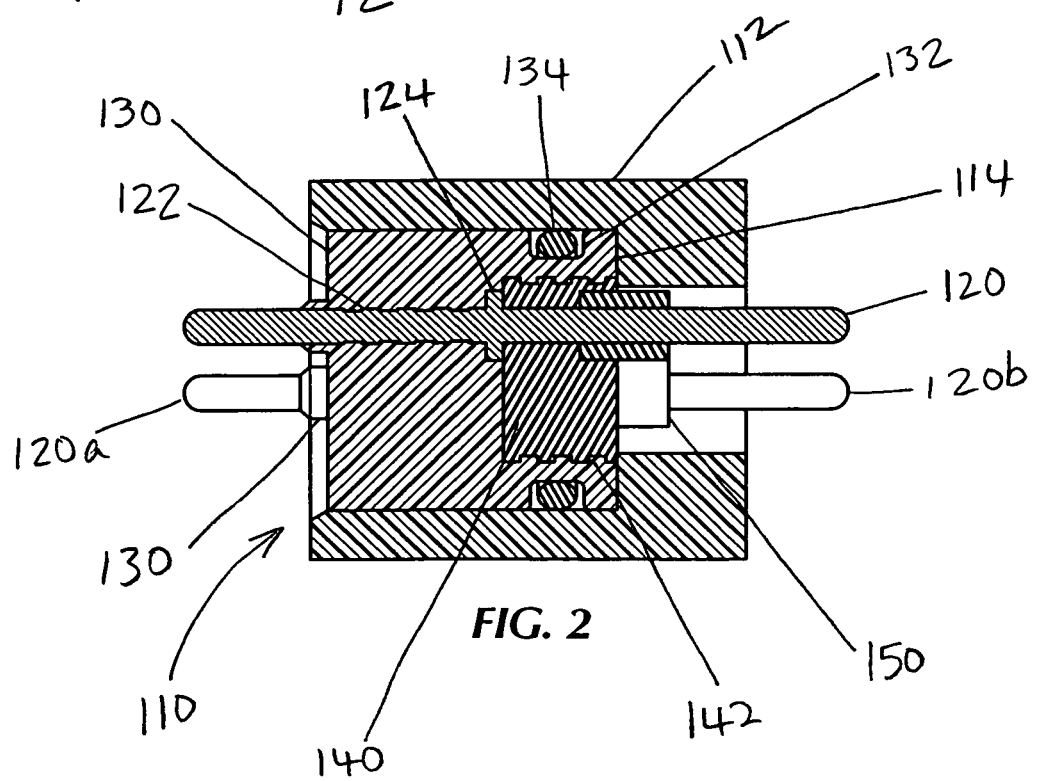
FIG. 2 is a side view, shown partially in cross section, of a hermetic pressure connector installed within a bulkhead, in accordance with a second preferred embodiment of the present invention.

With reference now to FIG. 2, a second embodiment electrical connector 110 is generally similar to the first embodiment electrical connector 10 with the key exceptions that the transverse support member 40 is replaced with an electrically insulative support member 140, and a shoulder 124 of conductor pin 120 bears directly against the insulative support member 140 (rather than against the intermediate insulating sleeve 50 as shown in the first embodiment electrical conductor 10). An insulating sleeve 150 is located on the conductor pin 120 on the low pressure side of the insulative support member 140. In general, elements of the second embodiment electrical connector 110 are assigned reference numbers incremented by 100 above corresponding elements of the first embodiment electrical connector 10. For example, the second embodiment connector 110 comprises seal rings 134 corresponding to the seal rings 34 of the first embodiment connector 10. With the exceptions noted above, the structure and operation of the second embodiment electrical connector 110 is generally similar to the structure and operation of the first embodiment electrical connector 10, and it is not necessary to describe the second embodiment 110 in further detail.

Figure 3:
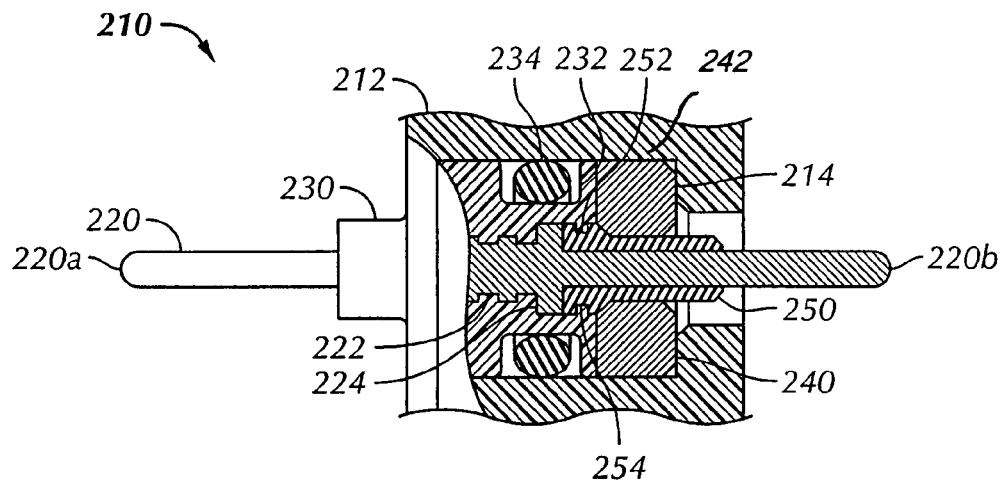
FIG. 3 is a side view, shown partially in cross section, of a hermetic pressure connector installed within a bulkhead, in accordance with a third preferred embodiment of the present invention.

With reference now to FIG. 3, a third embodiment of the electrical connector 210 is generally similar to the first embodiment electrical connector 10, with the key exception that a single pin 220 is shown. In general, elements of the third embodiment electrical connector 210 are assigned reference numbers incremented by 200 above corresponding elements of the first embodiment electrical connector 10. With the exceptions noted above, the structure and operation of the third embodiment electrical connector 210 is generally similar to the structure and operation of the first embodiment electrical connector 10, and it is not necessary to describe the third embodiment 210 in further detail.

Figure 4:
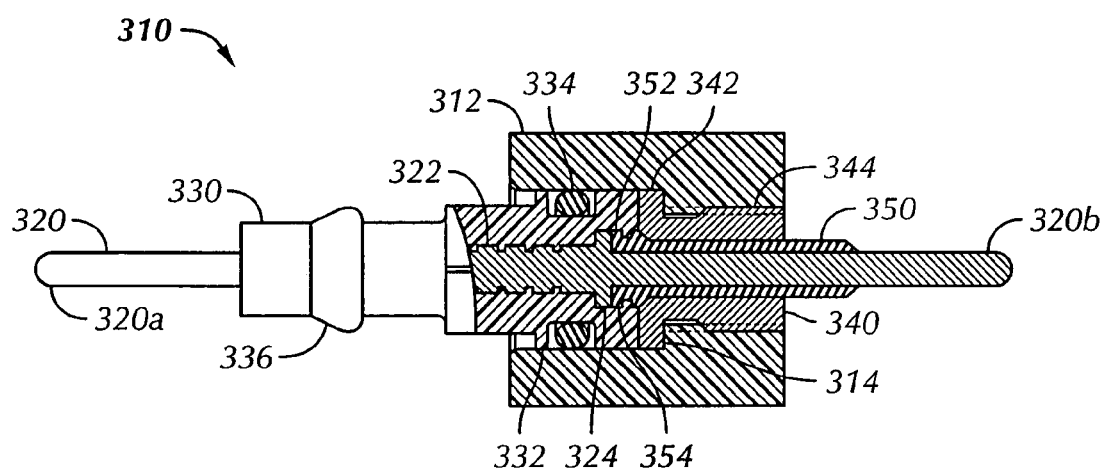
FIG. 4 is a side view, shown partially in cross section, of a hermetic pressure connector installed within a bulkhead, in accordance with a fourth preferred embodiment of the present invention.
Figure 5:
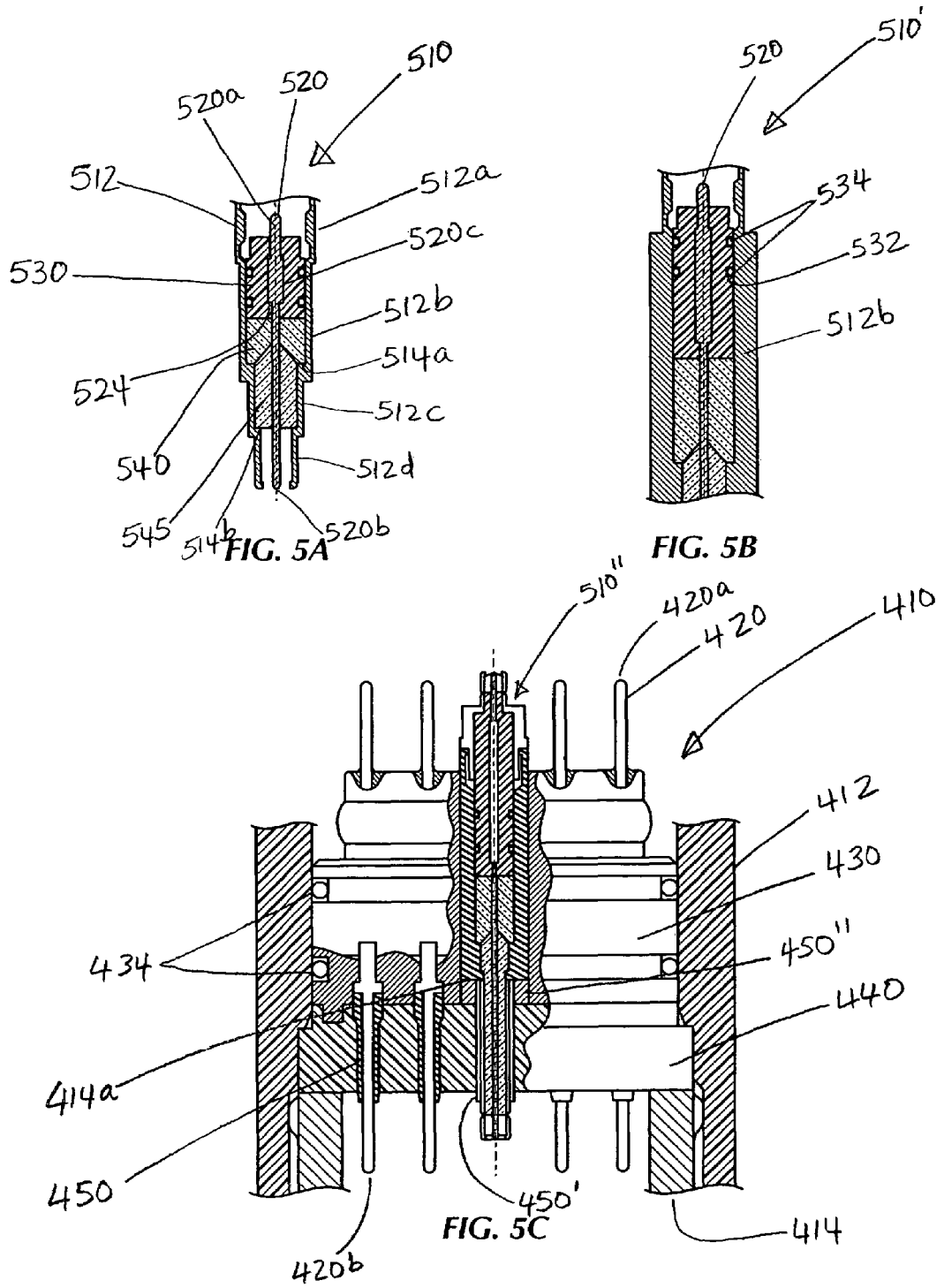
FIGS. 5A, 5B and 5C are side views, shown partially in cross section, of first, second and third embodiments of coaxial connector subassemblies in accordance with the present invention, with the third preferred embodiment coaxial connector subassembly shown in FIG. 5C installed in a combination coaxial and pin hermetic connector installed within a bulkhead, in accordance with a fifth preferred embodiment electrical connector of the present invention.

With reference now to FIG. 4, a fourth embodiment of the electrical connector 310 is generally similar to the first embodiment electrical connector 10, with the key exceptions that a single pin 320 is shown, a transverse support member 340 includes a threaded portion 344 adapted to engage mating threads in a bulkhead 312, and a connector body 330 is provided with a coupling ridge 336 to retain a female receptacle thereon. In general, elements of the fourth embodiment electrical connector 310 are assigned reference numbers incremented by 300 above corresponding elements of the first embodiment electrical connector 10. With the exceptions noted above, the structure and operation of the fourth embodiment electrical connector 310 is generally similar to the structure and operation of the first embodiment electrical connector 10, and it is not necessary to describe the fourth embodiment 310 in further detail.

With reference now to FIGS. 5A, 5B and 5C, first, second and third embodiments of coaxial electrical connector subassemblies 510, 510' and 510" may be incorporated into additional embodiments of the present invention. For example, in FIG. 5C the third embodiment coaxial electrical connector subassembly 510" is shown incorporated into a fifth embodiment hermetic electrical connector 410. The fifth embodiment connector 410 is generally similar to the first embodiment electrical connector 10, comprising a plurality of pins 420, a connector body 430, a transverse support member 440 and insulating sleeves 450. The outer circumference of the transverse support member 440 of the fifth embodiment connector 410 seats against a pressure bearing ledge 414 to transfer load from the molded connector body 430 and the conductor pins 420 to the bulkhead 412. Unlike the first embodiment connector 10, the fifth embodiment connector 410 further comprises a coaxial electrical connector, more specifically comprising the third embodiment coaxial electrical connector subassembly 510".

Each of the first, second and third embodiment coaxial electrical connector subassemblies 510, 510' and 510" comprises an electrically conductive outer sleeve 512 and a conductor pin 520. The conductor pin 520 is supported within the outer sleeve 512 by a connector body 530, a first support member 540 and a second support member 545. The outer sleeve 512 includes a first section 512a, a second section 512b, a third section 512c and a fourth section 512d. Outer and inner diameters of the first through fourth sections 512a-512d decrease in sequence from the first section 512a to the fourth sections 512d, forming two pressure bearing shoulders 514a and 514b. The conductor pin 520 has a high pressure end 520a and a low pressure end 520b as well as a middle portion 520c. The middle portion 520c is provided with a larger outer diameter than the diameters of either the high pressure end 520a or low pressure end 520b. Thus, shoulders 524 are formed at each end of the middle portion 520c. The connector body 530 bears against the first support member 540, and the first support member 540 in turn bears against both the first pressure bearing shoulder 514a and the second support member 545. The second support member 545 is supported by the second pressure bearing shoulder 514b. Presently preferred materials of construction for the first and second support members are a ceramic material such as Alumina for the first support member and a polymeric material, such as polytetrafluoroethylene ("PTFE") for the second support member. This construction is required to maintain proper impedance values along the length of the coaxial connector subassembly.

With particular reference now to FIG. 5C, the third embodiment coaxial connector subassembly 510" is electrically isolated from the support member 440 by insulating sleeve 450'. The third embodiment coaxial subassembly 510" bears against the upper structural portion 450" of the insulating sleeve 450' at the shoulder 414a. The insulating sleeve 450' may be constructed as separate components as shown or as one continuous element. The coaxial connector subassemblies 510, 510' or 510" need not be incorporated into an electrical connector having both pin and coaxial electrical connectors. The coaxial connector subassemblies could be molded singularly or in combination with additional coaxial connector subassemblies into complete electrical connectors. Further, this inventive construction could be extended to triaxial, quadraxial or any number of concentric alternating electrically conductive and insulating layers.

Figure 6:
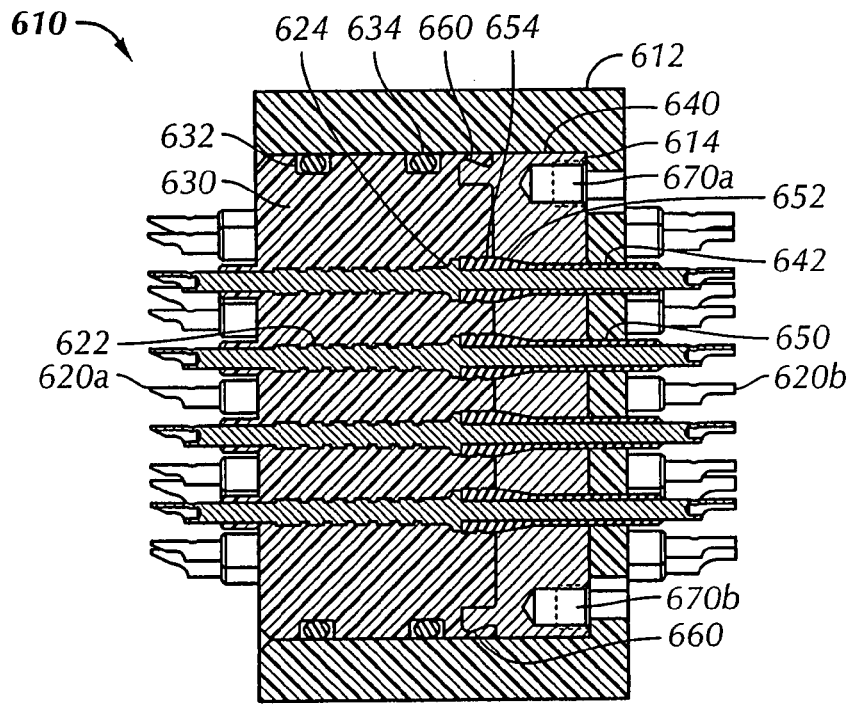
FIG. 6 is a side view, shown partially in cross-section, of a hermetic pressure connector installed within a bulkhead, in accordance with a sixth preferred embodiment of the present invention.

With reference now to FIG. 6, a sixth embodiment of the electrical connector 610 is generally similar to the first embodiment electrical connector 10, with the key exceptions that there exists a dovetail retention feature 660 interlocking the transverse support member 640 to the molded connector body 630. The dovetail retention feature 660 is a generally annular ring that extends generally axially from the transverse support member 640 and includes an enlarged distal end. The dovetail retention joining method allows the molded connector body 630 to be positively locked to the transverse support member 640 to produce a stronger joint than other types of joining methods. The present invention is not limited to foregoing joining method. For instance, the dovetail retention feature could have discrete segments instead of being annular (not shown). Further alternatives to the dovetail retention feature are the dado joining method, the lap joining method, and the mortise and tenon joining method. Other alternatives are well known to those of ordinary skill in the art. The sixth embodiment electrical connector 610 also includes two alignment holes 670a, 670b for aligning the transverse support member 640 in relation to the bulkhead 612. In addition, the conductor pins 620 of the sixth embodiment electrical connector 610 are different from the conductor pins 20 of the first embodiment electrical connector 10. The high pressure and low pressure ends 620a, 620b of the sixth embodiment electrical connector are open ended compared to the closed round shape of the high pressure and low pressure ends 20a,20b of the first embodiment electrical connector. In general, elements of the sixth embodiment electrical connector 610 are assigned reference numbers incremented by 600 above corresponding elements of the first embodiment electrical connector 10. With the exceptions noted above, the structure and operation of the sixth embodiment electrical connector 610 is generally similar to the structure and operation of the first embodiment electrical connector 10, and it is not necessary to describe the sixth embodiment in further detail.

Figure 7:
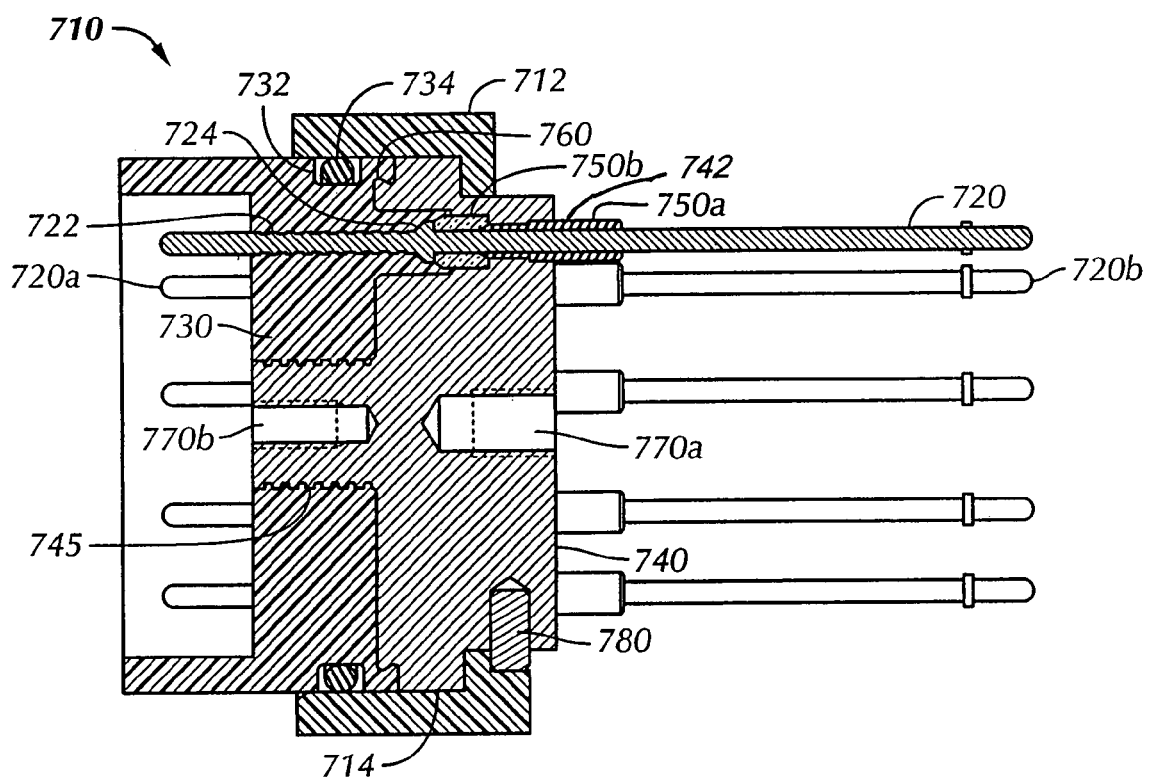
FIG. 7 is a side view, shown partially in cross-section, of a hermetic pressure connector installed within a bulkhead, in accordance with a seventh preferred embodiment of the present invention.

With reference now to FIG. 7, a seventh embodiment of the electrical connector 710 is generally similar to the first embodiment electrical connector 10, except for the differences noted below. The seventh embodiment electrical connector 710 includes a dovetail retention feature 760 interlocking the transverse support member 740 to the molded connector body 730 as described above in connection with the sixth embodiment electrical connector 610 except that it is disc shaped as opposed to annular shaped. Two coaxial alignment holes 770a, 770b are oppositively disposed on the transverse support member 740 for the purpose of insertion and removal into the bulkhead. The seventh embodiment electrical connector 710 also includes a dowel pin 780 for aligning the transverse support member 740 to the bulkhead 712. The seventh embodiment electrical connector 710 includes a two-piece insulating sleeve insert 750a, 750b compared to the one-piece insert 50 of the first embodiment electrical connector 10. The first insulating sleeve insert 750a is an elongated generally thin tubular member that surrounds the pin. The second insulating sleeve insert 750b is also an elongated tubular member but it is slightly thicker than the first insert 750a. The second insert 750b engages the conductor pin shoulder 724. As compared to the first embodiment electrical connector 10, the transverse support member 740 of the seventh embodiment electrical connector 710 includes a base portion 740a that extends through the molded connector body 730 to its rear surface thereof. The base portion 740a of the transverse support member 740 of the seventh embodiment electrical connector 710 includes circumferential grooves 745. The grooves 745 assist in retaining the transverse support member 740 to the molded connector body 730. In general, elements of the seventh embodiment electrical connector 710 are assigned reference numbers incremented by 700 above corresponding elements of the first embodiment electrical connector 10. With the exceptions noted above, the structure and operation of the seventh embodiment electrical connector 710 is generally similar to the structure and operation of the first embodiment electrical connector 10, and it is not necessary to describe the seventh embodiment electrical connector 710 in further detail.

Figure 8:
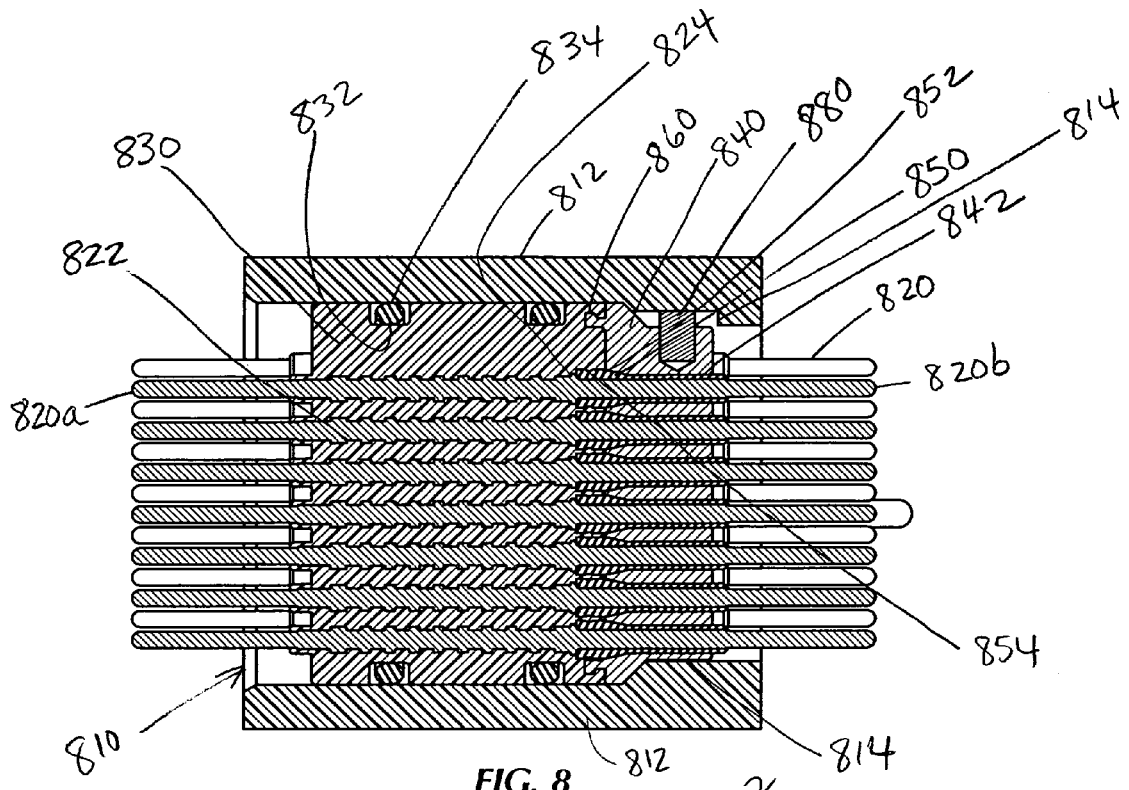
FIG. 8 is a side view, shown partially in cross-section, of a hermetic pressure connector installed within a bulkhead, in accordance with an eighth preferred embodiment of the present invention.

With reference now to FIG. 8, an eighth embodiment of the electrical connector 810 is generally similar to the first embodiment electrical connector 10, except for the differences noted below. The eighth embodiment electrical connector 810 includes a dovetail retention feature 860 interlocking the transverse support member 840 to the molded connector body 830 as described above in connection with the sixth embodiment electrical connector 610. The eighth embodiment electrical connector 810 also includes a dowel pin 880 for aligning the transverse support member 840 to the bulkhead 812. The bulkhead 812 and the transverse support member 840 include mating sloped edges for the purpose of ease of insertion in a deep blind hole bulkhead. In general, elements of the eighth embodiment electrical connector 810 are assigned reference numbers incremented by 800 above corresponding elements of the ninth embodiment electrical connector 910. With the exceptions noted above, the structure and operation of the eighth embodiment electrical connector 810 is generally similar to the structure and operation of the first embodiment electrical connector 10, and it is not necessary to describe the eighth embodiment electrical connector 810 in further detail.

Figure 9:
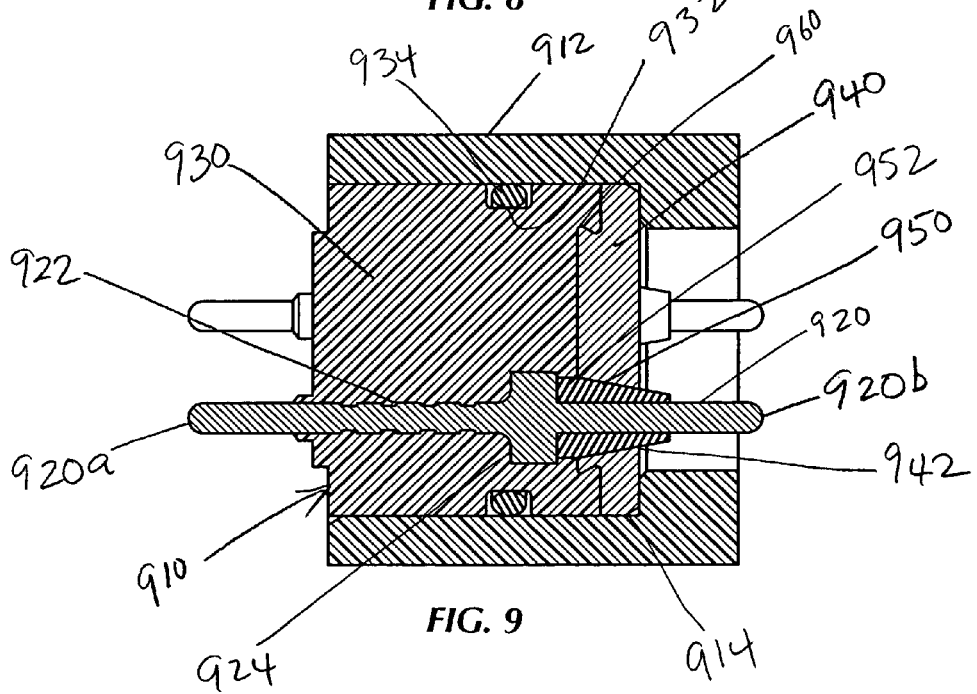
FIG. 9 is a side view, shown partially in cross-section, of a hermetic pressure connector installed within a bulkhead, in accordance with a ninth preferred embodiment of the present invention.

With reference now to FIG. 9, a ninth embodiment of the electrical connector 910 is generally similar to the first embodiment electrical connector 10, except for the differences noted below. The ninth embodiment electrical connector 910 includes a dovetail retention feature 960 interlocking the transverse support member 940 to the molded connector body 930 as described above in connection with the seventh embodiment electrical connector 710. The ninth embodiment electrical connector 910 also includes an insulating sleeve 950 that is a tapered pre-machined boss insert. The insulating sleeve 950 which is generally frusto-conically shaped and is generally thicker in diameter than the insulating sleeve 50 of the first embodiment electrical connector. The shoulder 924 on each conductor pin 920 is correspondingly sized to the insulating sleeve 950. In general, elements of the ninth embodiment electrical connector 910 are assigned reference numbers incremented by 900 above corresponding elements of the first embodiment electrical connector 10. With the exceptions noted above, the structure and operation of the ninth embodiment electrical connector 910 is generally similar to the structure and operation of the first embodiment electrical connector 10, and it is not necessary to describe the ninth embodiment electrical connector 910 in further detail.

Figure 10:
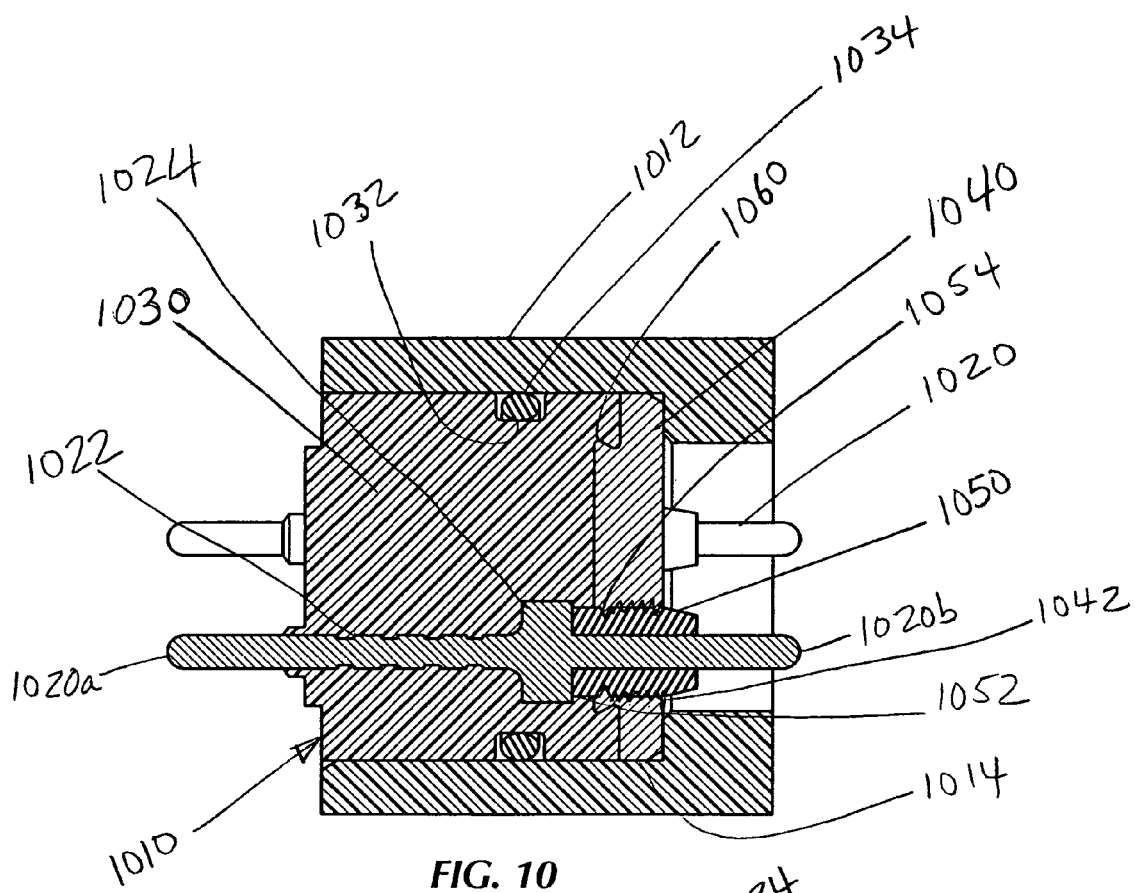
FIG. 10 is a side view, shown partially in cross-section, of a hermetic pressure connector installed within a bulkhead, in accordance with a tenth preferred embodiment of the present invention.

With reference now to FIG. 10, a tenth embodiment of the electrical connector 1010 is generally similar to the ninth embodiment electrical connector 910, except for the differences noted below. The insulating sleeve 1050 included in the tenth embodiment electrical connector 1010 is generally cylindrically shaped with a threaded end on the low pressure side. The insulating sleeve 1050 is threaded into the transverse support member 1040. In general, elements of the tenth embodiment electrical connector 1010 are assigned reference numbers incremented by 1000 above corresponding elements of the ninth embodiment electrical connector 90. With the exceptions noted above, the structure and operation of the tenth embodiment electrical connector 1010 is generally similar to the structure and operation of the ninth embodiment electrical connector 910, and it is not necessary to describe the tenth embodiment electrical connector 1010 in further detail.

Figure 11:
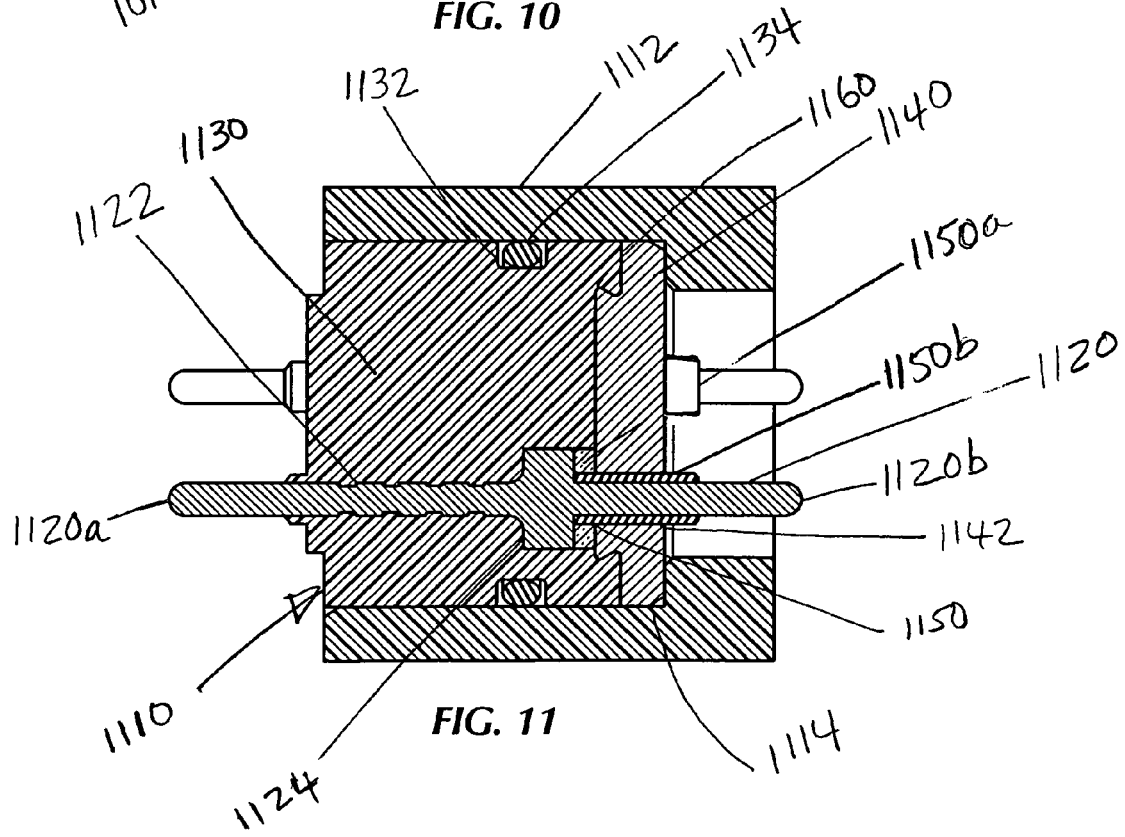
FIG. 11 is a side view, shown partially in cross-section, of a hermetic pressure connector installed within a bulkhead, in accordance with an eleventh preferred embodiment of the present invention.

With reference now to FIG. 11, an eleventh embodiment of the electrical connector 1110 is generally similar to the ninth embodiment electrical connector 910, with the key exception that the insulating sleeve 1150 in the eleventh embodiment electrical connector 1110 is a two-piece insert 1150a, 1150b. The two-piece insert has a first insert 1150a constructed of a relatively high strength insulating material and a second insert 1150b constructed of a relatively lower strength insulating material. The high strength material could be a ceramic or other high strength materials known to people of ordinary skill in the art. The lower strength material could be a polymeric material or other lower strength material known to people of ordinary skill in the art. The second insert 1150b is a generally elongated relatively thin tube while the first insert 1150a is disc shaped and surrounds the base portion of the second insert 1150b, engaging the shoulder 1124 of the conductor pin 1120. In general, elements of the eleventh embodiment electrical connector 1110 are assigned reference numbers incremented by 1100 above corresponding elements of the first embodiment electrical connector 10. With the exceptions noted above, the structure and operation of the eleventh embodiment electrical connector 1110 is generally similar to the structure and operation of the ninth embodiment electrical connector 910, and it is not necessary to describe the eleventh embodiment electrical connector 1110 in further detail.

Figure 12:
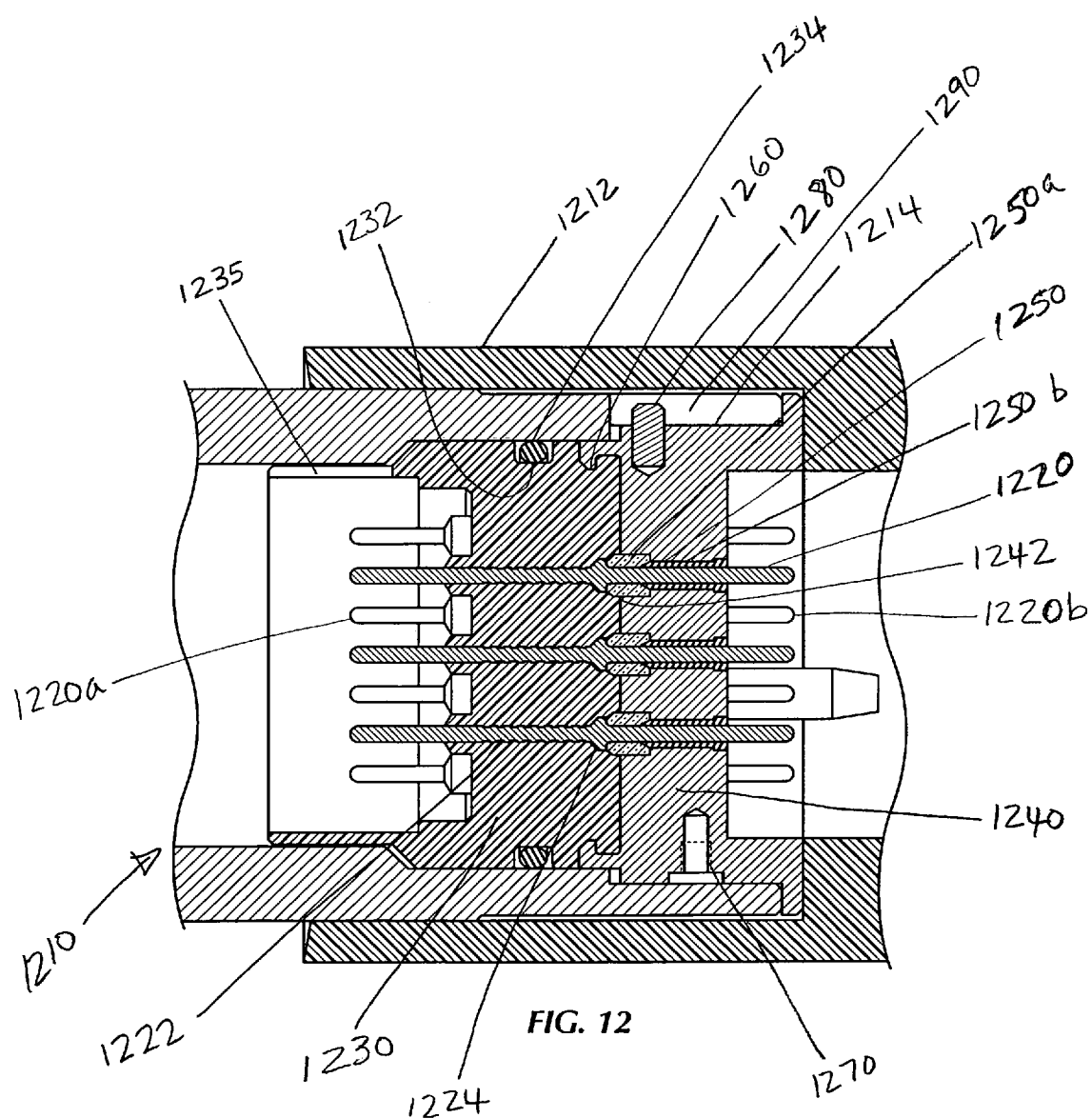
FIG. 12 is a side view, shown partially in cross-section, of a hermetic pressure connector installed within a bulkhead, in accordance with a twelfth preferred embodiment of the present invention.

With reference now to FIG. 12, a twelfth embodiment of the electrical connector 1210 is generally similar to the first embodiment electrical connector 10, except for the differences noted below. The twelfth embodiment electrical connector 1210 includes a dovetail retention feature 1260 interlocking the transverse support member 1240 to the molded connector body 1230, as described above in connection with the sixth embodiment electrical connector 610. The twelfth embodiment electrical connector 1210 includes a dovetail feature 1260 which is generally L-shaped in cross section and has a slightly tapered radially inward edge. The insulating sleeve of the twelfth embodiment electrical connector is a two-piece insert 1250a, 1250b essentially of the type described in connection with the seventh embodiment electrical connector 610. The twelfth embodiment electrical connector 1210 also includes a dowel pin 1280 for alignment to the bulkhead 1212. The upper portion of the dowel pin 1280 sits in a slot 1290. The slot 1290 allows the dowel pin 1280 to be properly received, thereby allowing for proper alignment of the transverse support member 1240 in relation to the bulkhead 1212. The twelfth embodiment electrical connector 1210 also includes a hole 1270 for retention to the bulkhead. The upper left portion of the bulkhead 1212 includes another slot 1235 for aligning a member (not shown) which mates with the pins 1220. In general, elements of the twelfth embodiment electrical connector 1210 are assigned reference numbers incremented by 1200 above corresponding elements of the first embodiment electrical connector 10. With the exceptions noted above, the structure and operation of the twelfth embodiment electrical connector 1210 is generally similar to the structure and operation of the first embodiment electrical connector 10, and it is not necessary to describe the twelfth embodiment electrical connector 1210 in further detail.

The method of making the connector 10 is discussed hereinbelow. For purposes of clarity, the method is described with reference to the first preferred embodiment connector 10 shown in FIG. 1 and is intended to be illustrative of the method of making all embodiments of the present invention. In preparation for placement into an injection mold (not shown), the conductor pins 20, insulating sleeves 50 and transverse support member 40 are preferably heated to at least approximately 200 degrees Fahrenheit, and preferably to approximately 400 degrees Fahrenheit, prior to injecting polymeric material into the mold. It is contemplated, however, that the step of heating the conductor pins 20, insulating sleeves 50 and transverse support member 40 could occur either before or after placing the conductor pins 20, insulating sleeves 50 and transverse support member 40 within the injection mold.

The conductor pins 20, insulating sleeves 50 and transverse support member 40 are placed within the injection mold having the desired finished shape of the connector body 30. Preferably substantially all air is removed from the mold prior to injecting the polymeric material into the mold. This is accomplished through evacuation of the mold using conventional apparatus such as a vacuum pump (not shown).

A polymeric material, most preferably PEK is injected into the injection mold for creating the connector body 30 which surrounds the conductor pins 20. Preferably the polymeric material is heated to at least 500 degrees Fahrenheit, and more preferably to about 700 degrees Fahrenheit, prior to injecting the polymeric material into the mold. The polymeric material is preferably injected into the mold at a pressure of at least 7500 pounds per square inch, and most preferably about 18,000 pounds per square inch. Following the injection step, the connector 10 is preferably heated to relieve stress in the polymeric material, thus minimizing the risk that post-cooling contraction of the connector body 30 will distort the conductor pins 20. It is preferred that the heating is to a minimum of the rated operating temperature of the connector 10, about 400-500 degrees Fahrenheit for application of the connector 10 in a downhole well.

Following the stress relief step, the entire assembly is permitted to cool, whereby the polymeric material of the connector body 30 shrinks and forms a bond with the conductor pins 20 and the insulating sleeve 50, capturing the circumferential grooves 22 and 52, respectively. The polymeric material also effectively captures the transverse support member 40 by bonding therewith, thus completing the supporting structure for the conductor pins 20.

The connector body 30, conductor pins 20, insulating sleeves 50 and transverse support member 40 are removed from the injection mold and the connector body 30 is machined to provide any features not specifically molded into the connector body 30, or to refine features that have been molded in.

From the foregoing it can be seen that the present invention comprises a hermetic electrical connector particularly well suited for service in high temperature and high pressure environments. It will be appreciated by those skilled in the art that changes could be made to the embodiments described above without departing from the broad inventive concept thereof. It is understood, therefore, that this invention is not limited to the particular embodiments disclosed.

We claim:

1. A hermetic pressure connector for providing a pressure-tight, electrically conductive connection through a hole in a bulkhead, the connector comprising;

a transverse support member having at least one passage extending through the transverse support member;

at least one conductor pin each having a high pressure end and a low pressure end, and an axial portion extending through the passage;

at least one insulating sleeve each surrounding at least the axial portion of each of the at least one conductor pin thereby electrically insulating the transverse support member from the at least one conductor pin, wherein each of the at least one insulating sleeve includes an enlarged base portion at one end thereof which engages a shoulder of the at least one conductor pin, which is positioned between the shoulder and the transverse support member and which is configured to provide stability to the at least one conductor pin; and a molded connector body surrounding at least a central portion of each of the at least one conductor pin at least at one of the high and low pressure ends to thereby mechanically support the at least one conductor pin in the at least one passage, the molded connector body being directly sealingly engaged with the at least one conductor pin, the at least one insulating sleeve and the transverse support member.

2. The hermetic pressure connector of claim 1, wherein the transverse support member includes a plurality of passages and there is a corresponding plurality of conductor pins having axial portions extending through respective passages, each conductor pin including the insulating sleeve surrounding the axial portion.

3. The hermetic pressure connector of claim 1, wherein the transverse support member is constructed of a metallic material.

4. The hermetic pressure connector of claim 1, wherein the at least one conductor pin includes a circumferential interlocking member encased by the molded connector body for interlocking the at least one conductor pin and the molded connector body.

5. The hermetic pressure connector of claim 4, wherein the circumferential interlocking member includes a circumferential groove formed in the at least one conductor pin.

6. The hermetic pressure connector of claim 1, wherein a circumferential groove is formed in an external surface of the molded connector body.

7. The hermetic pressure connector of claim 6, wherein an endless circumferential seal is positioned in the circumferential groove.

8. The hermetic pressure connector of claim 1, wherein the at least one conductor pin is constructed of beryllium copper.

9. The hermetic pressure connector of claim 1, wherein the transverse support member has an outside diameter that is substantially equal to an outside diameter of the molded connector body.

10. The hermetic pressure connector of claim 1, wherein the molded connector body is constructed of a polymeric material.

11. The hermetic pressure connector of claim 10, wherein the at least one conductor pin and transverse support member are insert-molded with the polymeric connector body.

12. The hermetic pressure connector of claim 1, wherein the insulating sleeve comprises at least one of a polyetheretherketone, a polyaryletherketone, a polyphenylene sulfide, a polybenzimidazole, a liquid crystal polymer, a structural glass, a polycrystalline diamond, a polyimide, a polyamidimide, a polyetherimide, a glass fiber composite, a ceramic, a ceramic coated metal, and a polymeric coated metal.

* * * * *